United States Patent
Aguzzoli

Patent Number: 5,813,197
Date of Patent: Sep. 29, 1998

[54] PROCESS AND PLANT FOR PACKAGING FLUID OR SEMI-FLUID PRODUCTS IN THERMOFORMABLE SYNTHETIC RESIN CONTAINERS

[75] Inventor: Carlo Aguzzoli, Roggio Emilia, Italy

[73] Assignee: Unifull S.p.A., Italy

[21] Appl. No.: 507,308

[22] PCT Filed: Feb. 16, 1994

[86] PCT No.: PCT/IB94/00014

§ 371 Date: Jun. 6, 1996

§ 102(e) Date: Jun. 6, 1996

[87] PCT Pub. No.: WO94/19240

PCT Pub. Date: Sep. 1, 1994

[30] Foreign Application Priority Data

Feb. 23, 1993 [IT] Italy ................................ RE93A0017

[51] Int. Cl.⁶ ........................................... B65B 47/00
[52] U.S. Cl. .................... 53/453; 53/433; 53/511; 53/551; 53/559
[58] Field of Search ................... 53/433, 450, 451, 53/511, 553, 554, 555, 551, 552, 453, 454, 559, 560

[56] References Cited

U.S. PATENT DOCUMENTS

| | | | |
|---|---|---|---|
| 2,160,367 | 5/1939 | Maxfield | 53/433 |
| 3,245,197 | 4/1966 | Van Mil, Jr. et al. | 53/453 |
| 3,456,422 | 7/1969 | Doucette | 53/511 |
| 3,505,705 | 4/1970 | Stroop | 18/5 |
| 4,133,162 | 1/1979 | Baumstingl | 53/450 |
| 4,747,253 | 5/1988 | Schulte | 53/511 |
| 4,964,259 | 10/1990 | Ylvisaker et al. | 53/433 |
| 5,454,208 | 10/1995 | Kawano | 53/433 |

FOREIGN PATENT DOCUMENTS

| | | | |
|---|---|---|---|
| 0169183 | 1/1986 | European Pat. Off. | B65B 3/02 |
| 1440396 | 4/1966 | France | B65B 3/02 |
| 1180301 | 10/1964 | Germany | B65B 3/02 |

*Primary Examiner*—Daniel Moon
*Assistant Examiner*—John Paradiso
*Attorney, Agent, or Firm*—Reising, Ethington, Learman & McCulloch, PLLC

[57] ABSTRACT

A continuous lamina (3) is indexed through a forming station so as to be arranged around a tubular element (14); edges of the lamina (3) are welded together to form an unexpanded envelope (2a) which is then inflated when the envelope (2a) is closed in a die (11) through opposite sides of which said tubular element (14) passes; a container (2) formed by expanding said envelope (2a) is then filled and closed while a following envelope (2a) is being expanded.

14 Claims, 4 Drawing Sheets

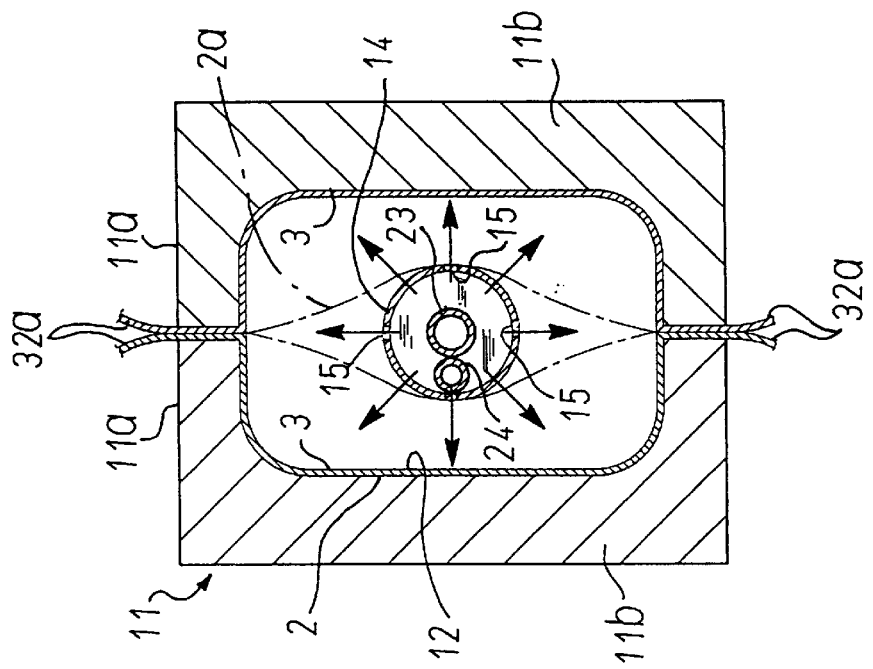
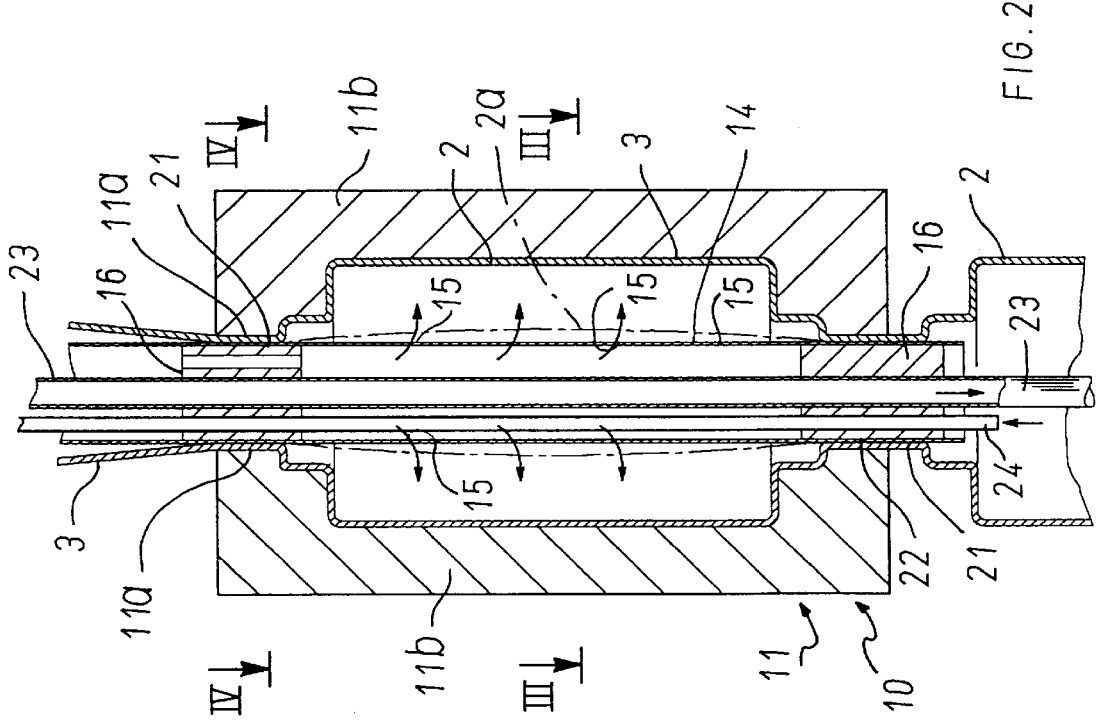

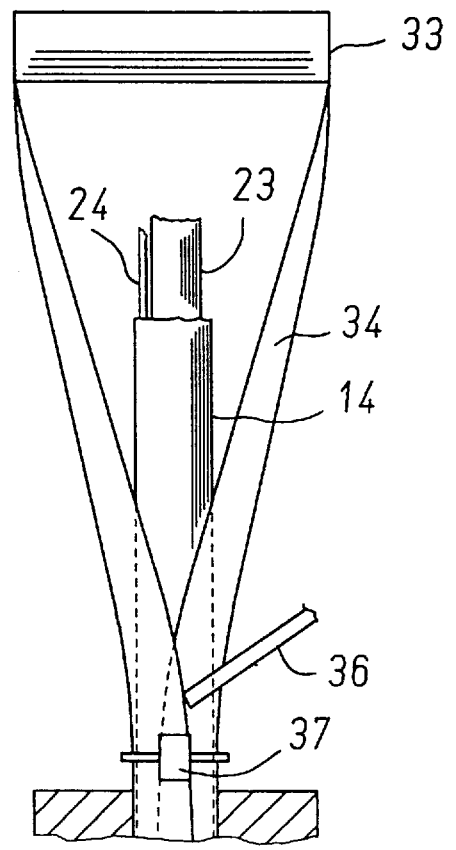
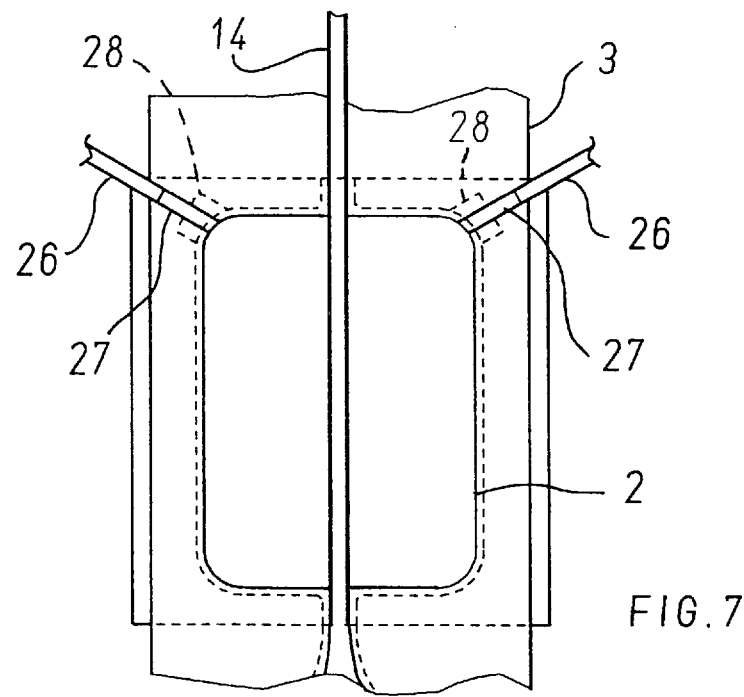

PROCESS AND PLANT FOR PACKAGING FLUID OR SEMI-FLUID PRODUCTS IN THERMOFORMABLE SYNTHETIC RESIN CONTAINERS

The invention concerns the packaging of fluid or semi-fluid products (that is, in liquid, semi-liquid, pasty, powdery form or in small-sized pieces) in thermoformable synthetic resin containers.

Prior art involves a process in which the chamber of the container is formed by first placing in a die two laminas of thermoformable synthetic resin in such a way that the opposing faces of the die, which surround the cavity of the die, heat solder the two laminas so as to create an unexpanded envelope within the cavity of the die. Immediately afterwards, a hot pressurized gas is introduced into the unexpanded envelope through one or more thin conduits to expand it, pressing its sides against the internal surfaces of the die that define the external shape of the container. Subsequently the said conduits are retracted and the laminas are completely soldered, also in the areas through which the said conduits passed. Subsequently the chamber is cut in a suitable area in order to create an opening; it is then filled through the said opening and finally the opening is re-closed by soldering in order to seal the contents.

U.S. Pat. No. 3,423,902, discloses a plant for the manufacture of flanged plastic containers in which two vertical curtains of thermoformable plastic material are inserted in the cavity of a die, a vertical tubular element being interposed between them, said tubular element being provided with a plurality of longitudinal passages through which selectively pressurized air is injected to form the container and subsequently a filling product is introduced into the container itself.

However the container manufactured by means of said plant cannot be completely filled with the product, because at least the presence of the tubular element in the container when the product is introduced into it prevents complete filling of the container when the tubular element is withdrawn from it before sealing the formed container.

Furthermore, operation of said plant is quite slow, mainly because the container must be filled in the same station, i.e. the die, in which forming takes place.

The advancing downwards of the vertical curtains is produced by a vertically downward stroke of the die in its closed condition, the die then being opened and then performing an upward return stroke. This cycle of movement of the die is guided by roller followers cooperating with fixed cams.

U.S. Pat. No. 3,505,705 discloses a plant similar to that of U.S. Pat. No. 3,423,902 except that it produces flangeless containers by including in the die electric heating elements around the outlines of the die cavities.

DE-B-1 180 301 discloses a plant which differs from those of U.S. Pat. Nos. 3,423,902 and 3,505,705 in a number of significant respects among which are that the containers are formed from a tube of plastics extruded round the vertical tubular element, that the tubular element extends through both of the top and bottom sides of the die during filling of a previously formed container, and that the die is formed of six sections which perform a complicated cycle of movements relative to each other and to the tubular element, which itself reciprocates vertically.

EP-A-0 169 183 discloses a plant in-which containers are produced by continuous extrusion of plastics, blow-moulding of the containers between two loops of die sections carried upon endless conveyors, the pressurized air being introduced horizontally to form the containers and the product being therafter introduced by way of a vertical filling tube, the closing sealing of the container being performed between each adjacent pair of containers at a time when the product is in a condition overflowing from the upper container of the pair into the next higher container.

U.S. Pat. No. 5,223,073 discloses a blow moulding system in which advancement clamps located before and after an array of moulds move two mutually facing films in a direction in which the following are arranged in sequence: two welding half-moulds, which by mutually welding the two films in preset regions define cells which are open toward an upper horizontal longitudinal edge of the films; two half-moulds for heating the welded films; and a cell forming station. Air injection nozzles, inserted between the two flaps of the films at the above mentioned longitudinal edge, and two forming half-moulds, in which forming cavities are defined at the cells, operate in the forming two flaps of the films at the above mentioned longitudinal edge, and two forming half-moulds, in which forming cavities are defined at the cells, operate in the forming station. Divaricators for divaricating the two flaps of the films are provided proximate to the forming station so as to facilitate the insertion of the air injection nozzles.

A first object of the invention is to find a process which is generally more economical and rational, is quicker and permits the container to be completely filled (leaving no air).

A further object of the invention is to find a process which is more suited to the packaging of products in a sterile manner, preventing contact of the chamber with the surrounding air and also preventing shards of material, produced when the container is cut in order to create an opening, from falling into the chamber itself: this being a drawback of some of the prior art.

Said objects and other objects are reached by the invention as defined in the claims.

According to one aspect of the present invention, there is provided a process for packaging fluid or semi-fluid products in thermoformable synthetic resin containers, each defining an internal chamber, comprising forming around tubular means a continuous hollow member of thermoformable synthetic resin, bringing together sections of a die to receive said hollow member between them and thereby to encircle said tubular means and to define a desidered external shape of a container, forming a chamber in said hollow member by injection of pressurized fluid through said tubular means, filling the container with a product through said tubular means, and sealing the container, characterized in that said continuous hollow member is formed by bringing together and sealing parts of at least one web of said thermoformable synthetic resin, which parts correspond to outlines of the containers.

According to a second aspect of the present invention, there is provided a plant, suitable for carrying out the process defined above, comprising a forming station with a die having at least two complementary hollow sections that, combined, form a cavity defining the external shape of the container, tubular means providing forming means to inject pressurized fluid into said cavity to form a chamber of defining the external shape of the container, tubular means providing forming means to inject pressurized fluid into said cavity to form a chamber of the container and filling means to introduce the product into the chamber, and sealing means to close the filled container, said tubular means extending in a separation plane of the die, characterized in that the plant includes, ahead of said forming station, roll means whereby the or each web is fed towards said forming station.

Embodiments of the invention are illustrated in the following four sheets of drawings.

FIG. 2 is an enlarged detail of FIG. 1.

FIG. 3 is section III—III of FIG. 2.

FIG. 6 is a schematic representation of a second embodiment of the plant.

FIG. 7 is a schematic representation of forming station 10 in a further embodiment.

Figure 1:
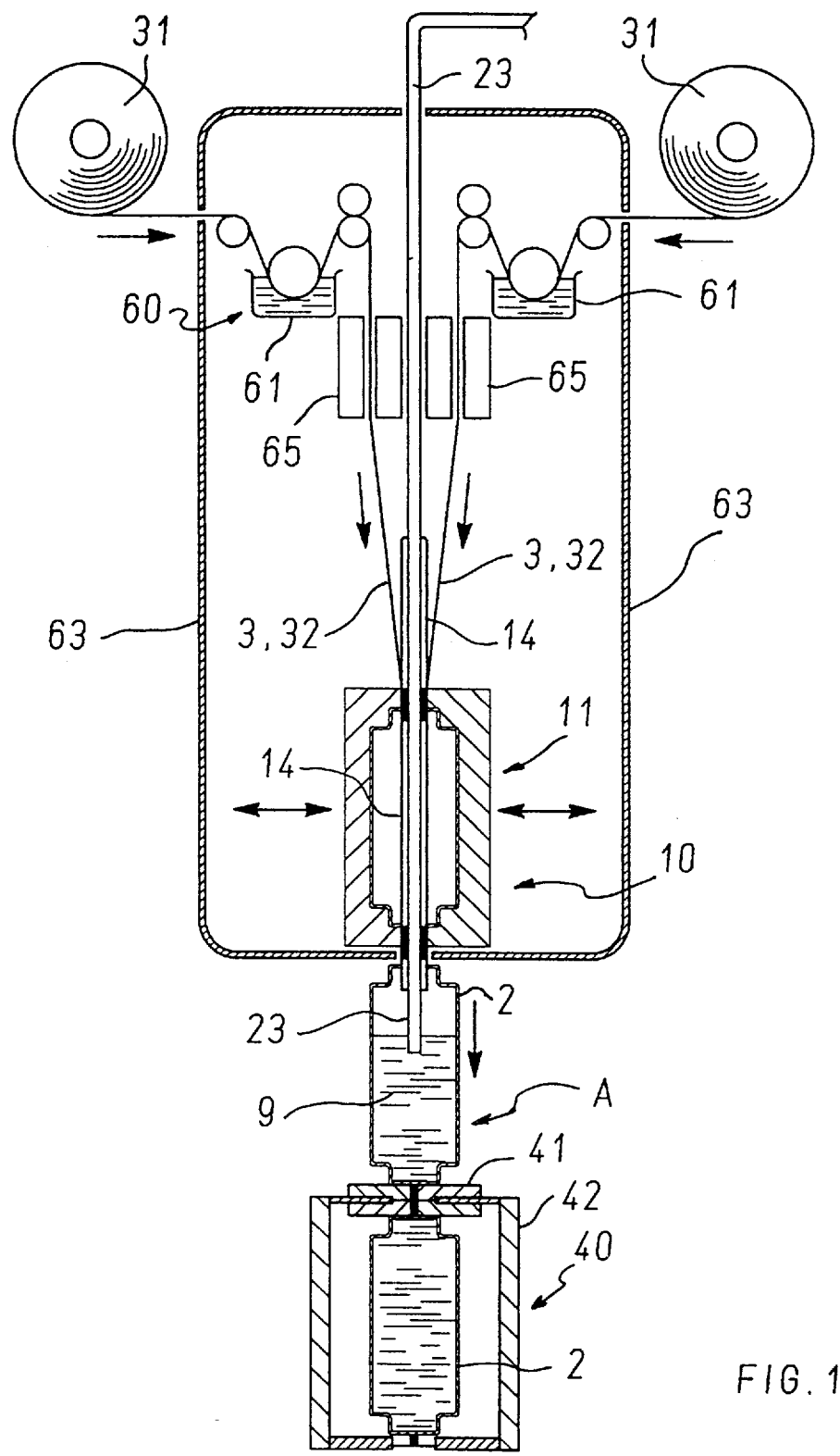
FIG. 1 is a general schematic representation of a first embodiment of the plant.

The plant includes a forming station 10 with a die 11 including two complementary hollow sections 11b, or halves, whose cavity 12 defines the shape of chamber 2 of the container. The hollow sections 11b, respectively, have matching faces 11a that close cavity 12, and which are preferably arranged in an essentially vertical separation plane.

A tubular element 14 passes through at least the upper part of cavity 12 preferably with an essentially vertical axis and placed in the separation plane between sections 11b. In the embodiments illustrated in the figures, the tubular element 14 crosses cavity 12 and extends beyond it both above and below it.

Upstream of the die 11 feeding means are provided to supply a continuous lamina of heat solderable resin in such a way as to cover the tubular element 14 and to form around it an unexpanded envelope 2a within cavity 12 (FIG. 3).

The embodiment illustrated in FIGS. 1 to 5 comprises feeding means, particularly two spools 31 from which, respectively, two continuous sheets 32 of heat solderable resin lamina 3 are unrolled, said sheets passing through sterilization means 60 and heating means 65; subsequently said sheets, parallel and in contact with each other, pass between the hollow sections 11b of the die, with tubular element 14 between them.

Each hollow section 11b is provided with two symmetrically distributed recesses 13 (FIG. 4), having a preferably semi-cylindrical shape, one above and one below, defining two cylindrical through-holes allowing the tubular element 14 to pass through the sides of die 11. The recesses 13 matching together when the hollow sections fit around tubular element 14.

The die 11 presses the two sheets 32 together by means of its faces 11a and solders said sheets in the respective areas of contact by means of heat produced by suitable heating elements, such as electric resistances.

Furthermore, the recesses 13 also press the sheets 3 against those parts of the tubular element 14 that pass through the sides of die 11. Thus, the two sheets 32 inside the cavity 12 make up the unexpanded envelope 2a, which is hermetically sealed by the joining of the two faces 11a and by the recesses 13 fitting around the tubular element 14.

The forming station 10 is also provided with forming means to introduce pressurized fluid, in particular sterile air, into the envelope 2a when it is closed by-the die 11 and the tubular element 14, that causes it to expand until its sides adhere to the walls of the cavity 12, thereby obtaining the final shape of the chamber 2.

Said forming means can preferably be defined by the tubular element 14 itself, communicating, above, with means (not shown) that supply the pressurized air, and inside with the cavity 12 by means of openings 15.

With each forming cycle of the chambers 2, the die 11 is closed around the sheets 32 in contact with each other and which enclose the tubular element 14; thus, edges 32a of sheets 32 around cavity 12 are soldered, whereas they are not soldered in the areas that are in contact with the element 14, though they are kept pressed against it thereby keeping the envelope 2a closed; the pressurized air is then introduced into the envelope 2a through the tubular element 14 and the envelope 2a expands and becomes permanently shaped by cavity 12. The resulting chamber has an upper hole 21 and a lower hole 22, preferably of the same diameter, due to the presence of the tubular element 14 at the points where it passes through the sides of the die.

After each forming cycle, the die 11 is opened and, by means of appropriate driving means (such as motorized rollers 19), the laminas 3, together with the chamber 2, are advanced downwards a distance equal to the vertical length of the die 11, or a little less. In this way, advancing alternately with the forming cycles, a continuous strip is created in the laminas 3, advancing downwards, that consists of a plurality of chambers 2 communicating with each other by means of contiguous openings 21 and 22 in the lower part of each chamber 2 and in the upper part of the next chamber 2 below it.

Beneath the forming station 10 the plant includes a soldering station 40. The chambers 2, as soon as they have been formed, are moved on with intermittent motion, alternately with the forming cycle (or even with a continuous motion), arriving first at an intermediate position A, beneath the die 11, and subsequently on to the soldering station 40, where by means of soldering means 41, an upper opening 21 of the chamber 2 that is positioned in the soldering station 40 and a lower opening 22 of the chamber 2 above it are closed by soldering.

The product 9 to be packaged is introduced in the succession of chambers 2 through the tubular element 14 whose lower outlet is in the intermediate position A.

In particular, as illustrated in FIGS. 1 to 5, between the chambers 2 positioned in stations 10 and 40, there is at least one chamber 2 in the intermediate position A.

The product 9 is preferably supplied through a filling conduit 23 that passes through the entire length of the tubular element 14 and which communicates above with filling means (of conventional type and not shown) that supply the product, whilst at the bottom end, the outlet is beneath the die 11.

Said supply can be continuous or intermittent.

Inside the tubular element 14 a breather conduit 24, or vent, is provided to enable the air to be expelled during the introduction of product 9. In each of the positions where the tubular element 14 passes through the sides of the die 11 a collar 16 (FIG. 4) is provided to stiffen the tubular element 14 against the pressure of the die 11. An upper collar 16 positioned in an upper part (FIG. 4) of the die 11 is crossed by conduits 23 and 24 and by holes 17 that enable the passage of pressurized air; a lower collar 16 at a lower part of the die is crossed only by conduits 23 and 24 and blocks the passage of the pressurized air since the latter must only be introduced in the cavity 12.

Figure 5:
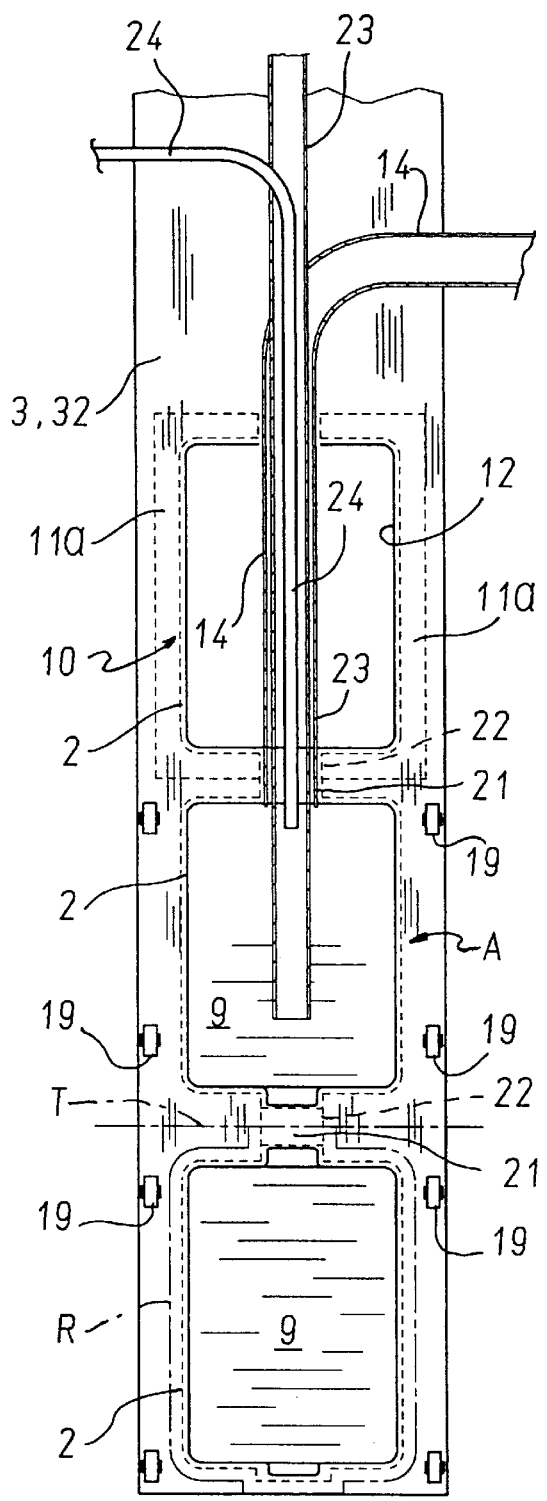
FIG. 5 is the axial section of FIG. 2
Figure 4:
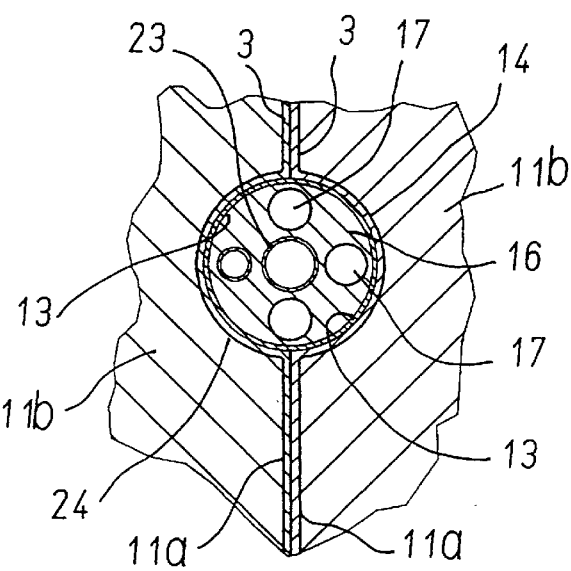
FIG. 4 is section IV—IV of FIG. 2

In order to completely fill the chamber 2, the supply of the product 9 is such that when the chamber 2 is in the soldering station 40 and before its upper opening 21 is soldered the level of the product 9 is above the opening 21 (as illustrated in FIG. 5). At this point the soldering means 41 close both opening 21 and the opening 22 of chamber 2 above it. Then, as the strip of chambers 2 is lowered one step, the chamber 2 in the intermediate position A moves into the soldering station 40 and, after the level of the product has once again risen above its opening 21, this opening is also closed as described above.

It is to be noted that with each closure of upper opening 21, the lower opening 22 above it is also closed, which permits the successive chamber 2 to be filled.

It is advantageous for the soldering cycles to occur at the same time as the forming cycles while the strip of chambers 2 is stationary.

In the intermediate position A, between the forming station 10 and the soldering station 40, a number of chambers 2 may be provided so as to form a larger volume to be filled with the product 9.

It is to be understood that, when sealing of the container takes place in the soldering station 40 by activation of the soldering means 41, the product may partially fill the chamber 2 in the intermediate position A, thereby preventing the presence of air in the sealed container, the latter having been constantly kept under an hydrostatic head determined by the excees of product.

The separation of each chamber 2 from the strip can take place in the soldering station 40 after it has been filled and closed with soldering means 41. This can occur by cutting the strip along a line T in a median position along the soldering area so as to leave both upper opening 21 of the chamber 2 containing the product 9 and lower opening 22 of chamber 2 above it closed. At the same time as cut T, cutting means 42 can carry out a contouring cut along line R in order to separate part of the soldered edge from chamber 2 to give the container the desired shape.

In this way the finished container is obtained, containing product 9, separated from the strip of chambers 2 and appropriately contoured. The final container obtained can be of any known type that can be obtained by means of injection of heated gas with resulting thermoforming. For example, at the same time as the cut along line T is made, it is possible to incorporate a line of weakness close to the upper opening 21 that enables it to be opened by the user.

The shape of the container may be different from the shape shown in the drawings: for instance the container may be provided with a supplementary opening distinct from the opening 21 that enables it to be opened by the user.

The two sheets 32 can be unwound from two separate spools 31 (as illustrated in FIG. 1) or from a single spool on which the sheet has already been folded longitudinally. According to an alternative embodiment, the sheet can be folded after it has been unwound from the spool so as to have two sheets side by side in contact with each other. The longitudinal fold line of sheets 32 can pass through cavity 12 without being pressed between faces 11a of the die.

In a further embodiment, illustrated in FIG. 6, there is a single spool 33 from which a single sheet 34 is unwound by means of known guiding devices (not shown); it is folded so as to wrap around tubular element 14 with the edges of sheet 34 overlapping each other in a longitudinal direction; said edges are then soldered together, for example, by heating them with hot air supplied through a tube 36 and pressing them together against tubular element 14 using roller 37. In this way a continuous cylindrical sheath is obtained wrapped closely around the tubular element 14 which is led through die 11 where it forms the unexpanded envelope 2a; said cylindrical sheath is then closed by the contact with recesses 13 that press it against the external surface of the tubular element 14. The subsequent forming of chambers 2 using pressurized hot air and the successive steps of the process are the same as described above.

FIG. 7 illustrates still a further embodiment of the forming station 10 which differs from that illustrated in FIG. I in that the pressurized gas is introduced in the envelope 2a through channels 27 formed between the two sheets 32 by corresponding grooves in the faces 11a.

After the die has been closed air is injected into envelope 2a using tubes 26 and through channels 27 to form the chamber 2. Then, using soldering means 28, the channels 27 are also closed. In this case, only feed conduit 23 and the breather conduit 24 pass through the tubular element 14.

The invention is suitable for packaging products in a sterile manner. Firstly, it is simple and easy to sterilize sheets 32 using sterilizing means 60, for example, consisting of a dip 61 in sterilizing liquid and/or heating means 65. Furthermore, the forming of the chamber 2 can be carried out using sterile gas and in the following steps, having enclosed the die in a simple protective casing 63, the internal surface of chamber 2 does not come into contact with the outside environment and so cannot be contaminated by it. Casing 63 can be a simple cover that encloses the die 11 and the sheets 32 and in which a sterile environment is maintained with a slight excess pressure.

In still a further embodiment not shown in the figures, the tubular element 14 passes through only the upper side of die 11 and not through the bottom side of it. During forming, then, chambers 2 are obtained that only have upper opening 21, product 9 is introduced through the tubular element 14 and, after having removed the chamber from tubular element 14, opening 21 is closed by soldering.

I claim:

1. Process for packaging fluid or semi-fluid products in thermoformable synthetic resin containers each defining an internal chamber, comprising providing around tubular means at least one continuous web of thermoformable synthetic resin, bringing together sections of a die to receive the at least one web between them and thereby to encircle said tubular means with said die having opposite entry and exit sides for said at least one web, and to seal together parts of said at least one web, which parts correspond to outlines of the containers, to define a desired external shape of the containers, forming a chamber in said at least one web by injection of pressurized fluid through said tubular means, filling the container with a product through said tubular means, and sealing the container, wherein said tubular means extends through both of said entry and said exit sides of said die throughout said process.

2. Process as claimed in claim 1, wherein the advancing condition of said at least one web alternates with the closed condition of the die.

3. Process as claimed in claim 1, wherein said at least one web is advanced by pullingly engaging said at least one web beyond said die.

4. Process as claimed in claim 1 and further comprising, after said forming of the chamber and before said filling of the container, removing the container from the die completely, said filling of the container comprising introducing the product into the chamber through said tubular means.

5. Process as claimed in claim 1, wherein a downwardly extending continuous strip is formed in said at least one web with a succession of chambers intercommunicating with each other through contiguous openings in the tops and bottoms of the chambers of each pair of adjacent chambers, said openings being formed by the presence of said tubular means that extends downwardly through said opposite sides of the die.

6. Process as claimed in claim 5, wherein the chambers, after being formed, are moved downwards while still joined together in said strip and each chamber is moved firstly to an intermediate position beneath the die, and then on to a sealing station where the upper opening of a full chamber and the lower opening of the chamber above it are closed by sealing, the introduction of the product taking place in the succession of chambers through the tubular means, the lower outlet of which is in the intermediate position.

7. Process as claimed in claim 1, wherein a single web is wrapped round the tubular means so that the edges of the web overlap each other longitudinally, said edges subsequently being sealed together so as to form a continuous cylindrical hollow member round the tubular means, said hollow member extending through the die where it provides an unexpanded envelope and where it is closed by the die pressing the hollow member against the tubular means.

8. Process as claimed in claim 7, wherein the sealing together of said edges includes pressing of said edges against said tubular means.

9. Plant, suitable for carrying out a process of packaging fluid or semi-fluid products in synthetic resin containers, comprising roll means whereby at least one web of thermoformable synthetic resin is fed, after said roll means a forming station with a die having at least two complementary hollow sections that, move together to, form a cavity defining the external shape of a container and to seal together at least parts of said at least one web, said die having an entry side and an exit side for said at least one web, and encircling a tubular means providing forming means to inject pressurized fluid into said cavity to form a chamber of the container and filling means to introduce a product into the chamber, and sealing means to close the filled container, said tubular means extending in a separation plane of the die, wherein said tubular means is arranged to extend through both said entry side and said exit side throughout said process.

10. Plant as claimed in claim 9 and further comprising driving means disposed after said die for engaging and advancing said at least one web.

11. Plant as claimed in claim 10, wherein said driving means comprises motorized rollers.

12. Plant as claimed in claim 9, and further comprising pressing means that presses overlapped longitudinal edges of a single web against the external surface of the tubular means, and heating means that heats said edges to seal them together.

13. Plant as claimed in claim 9, wherein said tubular means is provided with upper and lower internal collars, the upper collar allowing the passage of the pressurized fluid and of the product, and the lower collar allowing the passage of the product only.

14. Plant as claimed in claim 9, wherein said filling means extends longitudinally axially of said at least one web and said forming means extends transversely of said filling means.

\* \* \* \* \*

UNITED STATES PATENT AND TRADEMARK OFFICE
CERTIFICATE OF CORRECTION

PATENT : 5,813,197
DATED : September 29, 1998
INVENTOR(S) : Carlo Aguzzoli

It is certified that error appears in the above-identified patent and that said Letters Patent is hereby corrected as shown below:

On the title page, item [75], change "Roggio" to --Reggio--;
  item [73], change "Unifull S.p.A." to --Unifill S.P.A.--.

Signed and Sealed this

Thirteenth Day of April, 1999

Attest:

Q. TODD DICKINSON

Attesting Officer

Acting Commissioner of Patents and Trademarks